Oct. 10, 1961
J. L. GRUPEN
3,003,427
PUMP STATOR
Filed Oct. 23, 1958
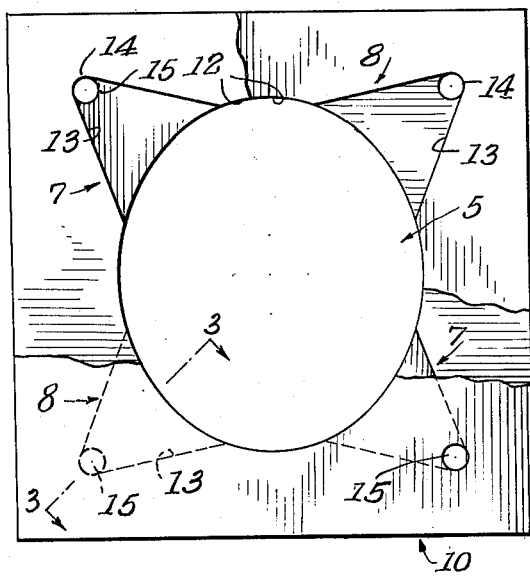
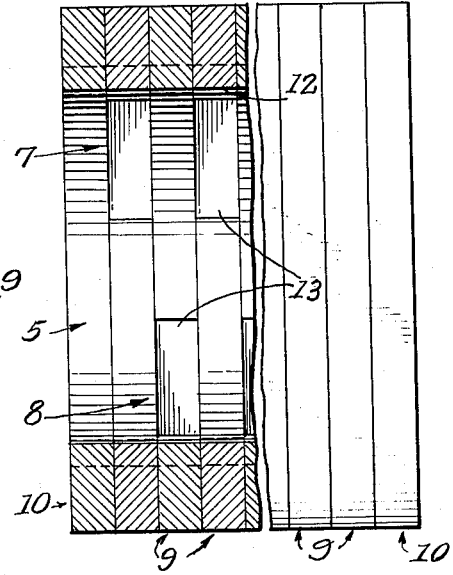
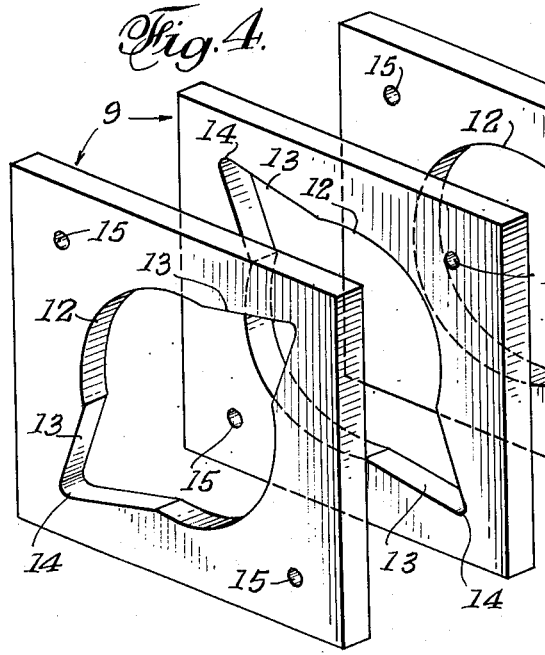
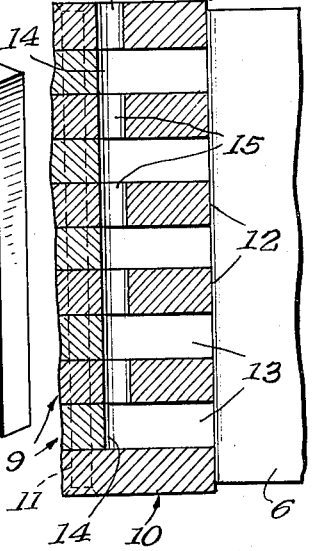
INVENTOR.
JAMES L. GRUPEN
BY C. G. Stratton
ATTORNEY 3,003,427
PUMP STATOR
James L. Grupen, San Gabriel, Calif.
(524 E. McKinley Ave., Sunnyvale, Calif.)
Filed Oct. 23, 1958, Ser. No. 769,248
4 Claims. (Cl. 103—136)

This invention relates to a stator construction for vane-type pumps. The term pump herein used is intended to include fluid-operated motors.

An object of the present invention is to provide a pump stator that is capable of rapid, economical assembly to the capacity size desired.

Another object of the invention is to provide a pump stator that has its port arrangement such that wear thereof, as well as of a rotor used in connection therewith, is so correlated and compensated for that the same is uniform throughout the areas of inter-engagement of stator and rotor.

A further object of the invention is to provide a stator that is formed as a laminated structure of identical laminations and in which the internal ports of said stator are economically achieved by providing the same as cut-outs in said laminations.

A still further object of the invention is to provide a laminated stator as above contemplated in which, by inverting alternate laminations, the ports are so staggered that the contemplated compensation for wear is achieved.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration for example only.

In the drawing, like reference characters designate similar parts in the several views.

FIG. 1 is an end view, with successive laminations broken away, of a pump stator according to the present invention.

FIG. 2 is a broken side view, partly in longitudinal section.

FIG. 3 is a fragmentary sectional view as taken on the line 3—3 of FIG. 1.

FIG. 4, to a reduced scale, is an exploded perspective view showing two adjacent stator laminations and an end lamination, as used in the present construction.

The present stator is designed to house a vane-provided rotor and, to this end, said stator is formed to have an elliptical bore 5 in which the rotor is disposed and against the wall of which vanes 6 (FIG. 3) are adapted to slidingly engage as the rotor rotates on its axis.

While the ports provided in the stator may vary in arrangement, the present structure includes two inlet ports 7 and two outlet ports 8, the ports of each pair being diametrally opposite. It will be realized that, in a fluid motor, the ports 7 would be the outlet ports and the ports 8 the inlet ports. Structurally there is no difference, the difference being in the direction of fluid flow.

The present stator comprises, generally, a set of similar plates or laminations 9, and similar end plates or caps 10, the whole being arranged in stacked relation and held tightly together in any suitable manner of which the rivet 11 (FIG. 3) is an example. Said plates may be made of any long-wearing material, steel being exemplary.

Each plate 9 is formed to have a central elliptical opening 12 and opposite V-shaped recesses 13 that terminate, at their opposed ends, in half-round portions 14. Said recesses open on the opening 12. In addition, each plate 9 is provided with two diametrally opposite holes 15 that, together with the portions 14, form a rectangular pattern arrangement on the plate. It will be realized that opening 12 constitutes part of the bore 5 and that recesses 13 constitute either parts of ports 7 or parts of ports 8.

Each end plate 10 is formed to have an elliptical opening 12 and a pair of holes 15. These plates differ from the plates 9 in that the recesses 13 and ends 14 thereof are omitted.

It will be noted that the recesses 13 have a diagonal disposition and that the holes 15 have a similar disposition but on a diagonal intersecting the diagonal of the recesses. As a consequence, when a plurality of plates 9 are stacked, as shown, with alternate plates reversed so that the recesses 13 of every other plate is at the same diagonal disposition as the holes 15 of the alternate plates, each port 7 and 8 will comprise a plurality of narrow longitudinally arranged port openings that, as shown best in FIG. 2, are longitudinally spaced by alternate plates or laminations. Since, as seen in FIG. 3, these port openings 13 are connected by their half-round portions 14 to the holes 15 of said alternate plates, there is flow in each port 7 and 8 to or from the bore 5, and said flow is distributed among the port openings 13 to be uniform across the stator.

In the above manner, the stator is provided with two pairs of diagonally arranged ports, one pair opening on one end plate 10 and comprising inlet ports and the other pair opening on the other end plate 10 and comprising outlet ports.

It will be seen from FIG. 3 that the rotor vanes 6, as they pass over the successive port openings 7 and 8, are subject to less wear in the portions that are aligned with said openings. Thus, because the inlet and outlet ports are staggered or offset, the wear along the entire length of the vanes is equalized. This, of course, contributes to the longevity of the device.

Since the structure is a laminated one, the same can be made as long or short as desired merely by varying the number of plates 9 used. As a consequence, the capacity of the pump may be controlled by selection of a suitable number of plates 9 in the assembly. Of course, the rotor is made to suit the length of the stator.

While the foregoing describes the details of the plates as being symmetrical, an asymmetrical design may be constructed based on the hereinabove described features. The recesses 13 need not be alike in form or size nor need the ends 14 and holes 15 fall in a symmetrical arrangement. In other words, the plates 9 need be assembled by reversal in one plane—such as a mirror reversal—and not in two planes, as are the present plates.

While reasonable accuracy of alignment of the oval opening 12 in the stack is necessary, accurate alignment of the ports is needed only to the degree that suitable flow may be obtained. Hence the plates of the stack are preferably oriented with respect to the oval openings when the same are assembled and secured together.

This application is an improvement of the pump shown in my pending application, Serial No. 560,620, now Patent No. 2,880,677.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention what is claimed and desired to be secured by Letters Patent is:

1. A stator for a rotor having vanes, said stator comprising a stack of plates in which each plate is formed to have a central opening and said openings being in register to constitute a bore in which the vanes of the rotor operate, the plates of the stack intermediate the ends being provided with diagonally opposed recesses opening on the central openings, the recesses of alternate plates being aligned on one diagonal and the recesses of the plates therebetween being aligned on an intersecting diagonal, each plate having two holes on a diagonal intersecting the diagonal on which the recesses thereof are disposed, the holes in one plate connecting the recesses of adjacent plates on each side, and each set of aligned recesses constituting a port for fluid moving in said bore.

2. A stator for a rotating vane type fluid-pressure device, said stator comprising a plurality of stacked plates each having a central opening, the openings being in register to form a bore for a vane type rotor, intermediate plates of the stack being provided with diagonally opposed recesses opening on the central openings to form ports, the recesses of alternating plates being aligned on different diagonals, the plates having pressure equalizing holes in the portions between recesses of adjacent plates on each side.

3. A stator for a rotating vane type fluid-pressure device, said stator comprising a plurality of stacked plates each having a central opening, the openings being in register to form a bore for a vane type rotor, intermediate plates of the stack being provided with diagonally opposed recesses opening on the central openings to form ports, the recesses of alternating plates being aligned on one diagonal, the other plates being reversed with the recesses aligned on an opposed diagonal, the plates being provided with pressure-equalizing holes in the portions between the recesses thereof so that the recesses and holes of adjacent plates are in communicating register.

4. In a stator for a rotor having vanes, a plate comprising one of a stack of similar plates connected together, said plate having a central opening against the wall of which the rotor vanes are adapted to engage, a diagonally arranged and opposed pair of port recesses opening on said central opening, each recess being V-shaped with its end remote from the central opening forming the angle of the V and the recesses diverging toward and being largest where they open on the central opening, and a pair of port-connecting holes in the plate arranged on a diagonal intersecting the diagonal on which the recesses are arranged and in the same spaced relation from the central opening as said remote ends of the recesses.

References Cited in the file of this patent
UNITED STATES PATENTS

| | | |
|---|---|---|
| 1,053,767 | Allan | Feb. 18, 1913 |
| 2,378,390 | Bertea | June 19, 1945 |
| 2,628,568 | Rhine | Feb. 17, 1953 |